United States Patent [19]

Demirjian et al.

[11] 4,437,026
[45] Mar. 13, 1984

[54] APPARATUS FOR ELECTRODE CURRENT CONTROL IN LINEAR MHD GENERATORS

[75] Inventors: Ara M. Demirjian, Arlington, Mass.; Albert Solbes, Rancho Palos Verdes, Calif.

[73] Assignee: The United States of America as represented by the United States Department of Energy, Washington, D.C.

[21] Appl. No.: 217,355

[22] Filed: Dec. 17, 1980

[51] Int. Cl.$^3$ ............................................. H02K 45/00
[52] U.S. Cl. .......................................... 310/11; 322/7
[58] Field of Search ................................ 322/7; 310/11

[56] References Cited

U.S. PATENT DOCUMENTS

| | | |
|---|---|---|
| 3,356,872 | 12/1967 | Woodson ............................. 310/11 |
| 3,792,340 | 2/1974 | Sheinkman et al. .................. 310/11 |
| 3,940,639 | 2/1976 | Enos et al. ............................ 310/11 |
| 3,940,640 | 2/1976 | Petty et al. ........................... 310/11 |
| 4,047,094 | 9/1977 | Rosa ..................................... 322/7 |

*Primary Examiner*—Donovan F. Duggan
*Attorney, Agent, or Firm*—Paul A. Gottlieb; Bruce R. Mansfield

[57] ABSTRACT

Apparatus for controlling a plurality of opposing, electrode, direct-currents at pre-set locations across a channel that comprises a converter for converting each electrode current into first and second periodic control signals which are 180° out of phase with respect to each other and which have equal magnitudes corresponding to the magnitude of the associated electrode current; and couplers for magnetically coupling individual ones of the first control signals and for magnetically coupling individual ones of the second signals such that the corresponding electrode currents are equalized or rendered proportional by balancing the same in the same or constant ratios in accordance with the locations of the electrode currents.

13 Claims, 2 Drawing Figures

APPARATUS FOR ELECTRODE CURRENT CONTROL IN LINEAR MHD GENERATORS

The United States Government has rights in this invention pursuant to Contract No. EF 77-C-01-2519 between the U.S. Department of Energy and the Avco-Everett Research Lab, Inc.

FIELD OF THE INVENTION

The present invention relates in general to control circuits for dc circuits of the type having a plurality of sets of opposed terminals or electrodes along a channel, and in particular to circuits for controlling diagonal direct-currents in diagonally connected MHD generators.

BACKGROUND OF THE INVENTION

In the field of dc circuits it is desirable to control the electrode currents of opposing electrodes along a channel. For example, electrode direct-current distribution in linear MHD generators exhibits a nonuniform pattern along the length of the generator channel. Such nonuniformities are particularly intense in diagonally connected generators and can impose high direct-current densities on individual electrodes, which may lead to accelerated erosion of the electrodes and thus reduce channel life. It is therefore of paramount importance to achieve direct-current control in dc circuits of the type having opposing electrodes along a channel, and more particularly in MHD generators which are diagonally connected.

In one approach, circuits to control diagonal currents in such diagonally connected generators have involved the use of resistive elements having nonlinear characteristics. Several such circuit arrangements are described in U.S. Pat. Nos. 3,940,639 (Enos et al) and 3,940,640 (Petty et al), which are incorporated by reference herein. As described in these patents, both active and passive impedances have been employed, and both the current flow between diagonally opposed electrodes and the voltage between adjacent discrete electrodes have been controlled. More specifically, the current control circuits have employed passive impedances such as direct current (dc) resistors and current limiter active circuits which produce a voltage drop sufficient to limit the current to each electrode to a predetermined value. One such current limiter circuit includes a conventional current sensor in the connecting line between diagonally opposed electrodes, the output of which is used to control the gain of a power transistor or like connected in series with the current sensor.

In one embodiment of the resistive voltage control circuits, a resistance is connected in series with a zener diode between adjacent electrodes. The voltage produced at the junction of the resistance and the zener diode controls a power transistor connected between the electrodes to oppose any tendency of the Hall voltage between the electrodes to exceed a limit determined by the resistance and diode. In a second embodiment of the voltage control circuits, a ballast resistor and power transistor switch and zener diode are connected in series between adjacent electrodes. The transistor switch is controlled by a sensing resistor connected between the electrodes.

Resistive controls, such as those described herein above, are dissipative, and hence, are not preferred for power producing MHD generators.

Another approach to controlling the performance of dc MHD generators is disclosed in U.S. Pat. No. 3,792,340 (Sheinkman et al), which is incorporated by reference herein. The Sheinkman et al approach involved utilizing the value of the MHD generator total power as a control criterion. More specifically, the voltages across the generator electrodes are periodically varied in a discrete manner. The change in the generator active power is determined for every time interval equal to the period of the discrete voltage variations, and control signals are generated in dependence on the changes in the active power so as to maintain a preset electrical load factor. In a preferred embodiment, the change in the active power is determined by converting the integral of the active power within the cycle of an alternating current (ac) main voltage into a power pulse proportioned to the integral and equal to the difference between two successive pulses constituting a pair. However, this type of approach is quite complex to implement, and moreover, does not attempt to control the plasma parameter variations between electrodes. It is also desirable to reduce axial currents along the generator channel.

SUMMARY OF THE INVENTION

Accordingly, it is a principal object of the present invention to provide effective control of electrode current distribution in dc circuits of the type, having a plurality of sets of opposed terminals or electrodes along a channel, and particularly diagonally connected MHD generators having a linearly extending MHD channel.

It is a further object to provide diagonal current control with minimum dissipation.

It is a further object to provide diagonal current control with no disruption to channel core conditions and with minimum perturbation of the channel operation in the event of circuit failure.

It is a still further object to control or regulate a plurality of sets of electrode currents in independent dc circuits having opposing electrodes or terminals so as to balance the currents in a preset or constant ratio in accordance with their location.

These and other objects are achieved by a control circuit constructed in accordance with the present invention which basically comprises a converter for converting each electrode current into first and second periodic control signals which are 180° out of phase with respect to each other at preset locations across the channel, and which have equal magnitudes corresponding to the magnitude of the associated electrode current; and couplers for magnetically coupling individual ones of the first control signals and for magnetically coupling individual ones of the second control signals such that the corresponding electrode currents are equalized or rendered proportional in the same or constant ratios according to the locations of the electrode currents across the channel. To this end, the electrode currents are rendered proportional in an equal 1:1 ratio or another, suitably chosen, 1:n, constant ratio in accordance with location of the electrode currents.

Preferably, each converter comprises switching means connected to the corresponding electrode current for producing first and second half-wave square signals constituting the first and second control signals, respectively.

Preferably, each magnetic coupler comprises transformers either for parallel magnetic coupling of at least one slave group of the coupled first and second control signals to a corresponding at least one predetermined master pair of the coupled first and second control signals; or for series magnetic coupling of the coupled signals.

The above and further novel features and advantages of the invention will appear more fully from the following detailed description when the same is read in connection with the accompanying drawing, and the novel features will be particularly pointed out in the appended claims. It is to be expressly understood, however, that the drawing is not to be intended as a definition of the invention but is for the purpose of illustration only.

DETAILED DESCRIPTION OF PREFERRED EMBODIMENTS

This invention is useful in the field of MHD generators having preset pairs of opposing electrodes along a channel. However, this invention is useful in any application where there are independent dc circuits having opposing electrodes. Thus, it will be understood by one skilled in the art from the following that the use of the term electrode is defined herein as being interchangeable with the term dc terminals in general in the case of any independent dc circuits. Thus, while the preferred embodiment is useful in connection with MHD electrodes, this invention is also useful in regulating currents in a wide variety of other applications. For example, this invention can be used to make a shunt motor having first and second terminals look like a series connected motor, or to drive two or more inherently unstable loads, like two or more arcs, from a single power source having pre-set pairs of opposing terminals.

Figure 1:
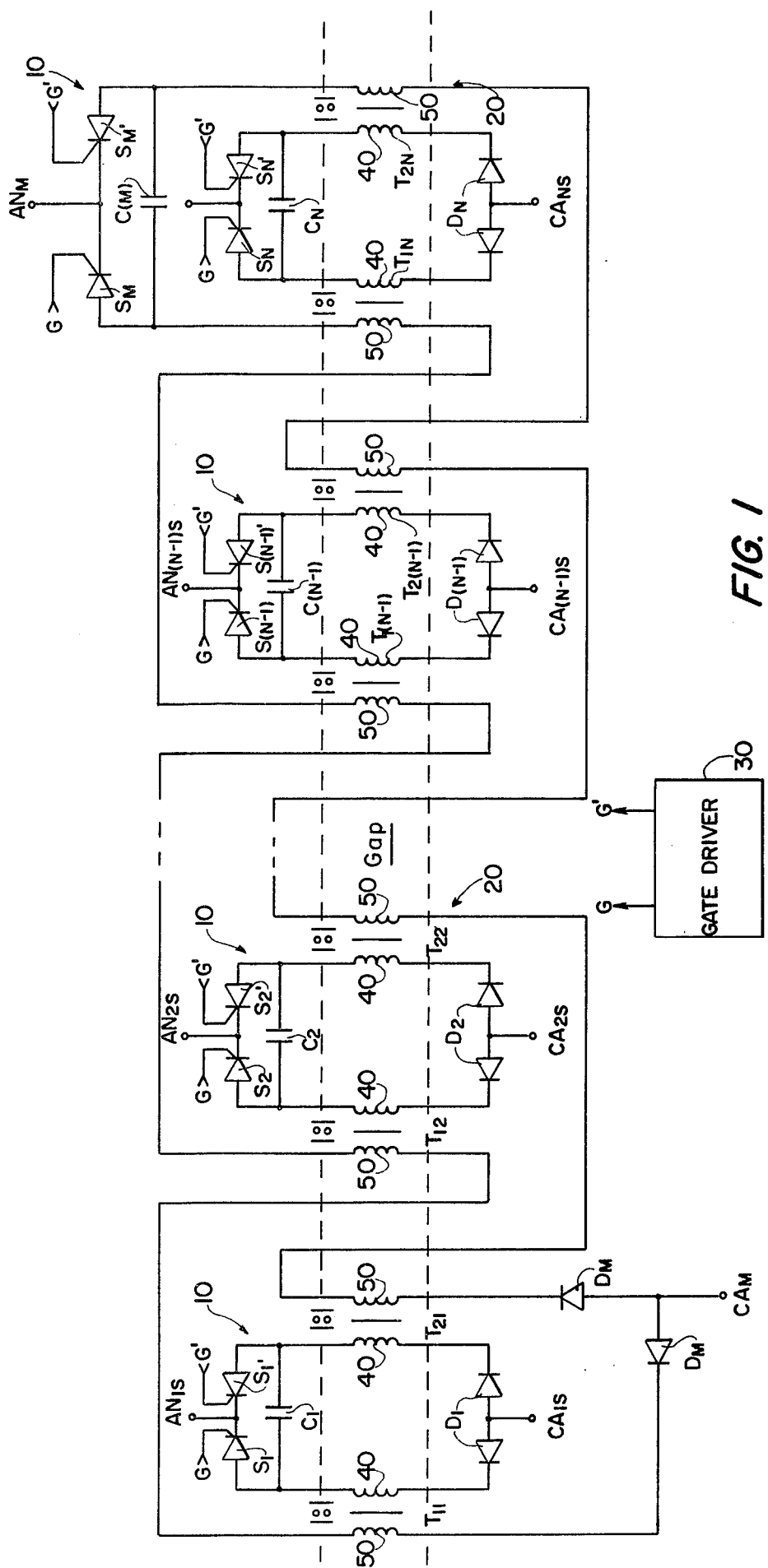
FIG. 1 is a schematic diagram of a first embodiment of a control circuit constructed in accordance with the present invention for controlling the currents in preset pairs of opposing electrodes along a channel.

For clarity, the structure of conventional MHD generators can be understood from FIG. 1 of the 17th Symposium, EAMHD, by A. Demirjian, S. Petty and A. Solbes, entitled "Electrode Development for Coal Fired MHD Generators," which is incorporated by reference herein.

As is well known in the art, MHD generators generally comprise a divergent, linearly-extending, duct or channel through which a high temperature plasma flows, a plurality of pairs of opposed electrodes which are spaced apart across gaps to form the channel and are disposed at spaced longitudinal positions along the length of the channel, and a coil or other means for generating a magnetic field which extends through the ducts at right angles to the direction of plasma flow. Voltages are induced between the electrode pairs as a result of the movement of the plasma relative to the magnetic field, and currents are caused to flow between interconnected electrodes. In a so-called "diagonally-connected" MHD generator, the opposed electrodes are diagonally staggered with respect to the longitudinal axis of the channel such that the opposed electrodes are at substantially the same potential and can be electrically interconnected. The power generated by each pair of opposed electrodes can be added to the power of all other electrode pairs and supplied to the terminals of the terminal electrodes. In the figures, the electrode pairs have been indicated by schematic representations of the respective anode and cathode electrodes of each pair, which have been generally denoted AN and CA, respectively.

Referring to the figures, a control circuit for controlling electrode current distribution in a MHD generator which is constructed in accordance with present invention generally comprises converters, which are generally denoted 10, for converting each electrode current into first and second periodic control signals which are 180° out of phase with respect to each other and which have equal magnitudes corresponding to the magnitude of the associated electrode current, and magnetic couplers, which are generally denoted 20, for coupling individual ones of the first and second control signals, respectively, such that the corresponding electrode currents are equalized or rendered proportional in the same or constant ratios in accordance with the locations of the electrode currents.

To this end, the electrode and control currents are rendered proportional in an equal 1:1 ratio or another suitably chosen constant ratio. For example, in some locations it is neither necessary nor desirable that all the electrode and control currents be exactly equal to achieve control. In some locations, such as at the ends of the MHD generator channel, for example, one may prefer to render the electrode and control currents proportional to each other in some suitably chosen, more general, constant ratios than 1:1. For that reason, couplers 20 for such electrode sets may be transformers having turns ratios of 1:n, in accordance with the location of the respective electrodes and their first and second periodic control signals produced by the converters 10. Thus, in one location where the magnitudes are equal, then the turns ratios of the couplers will be equally proportioned in the ratio of 1:1. On the other hand, in another location where it is desired that the magnitudes be not exactly equal, then the ratio of the respective transformer turns may not be 1:1, but may be in a different ratio of 1:n so that the ratio of the magnitudes of the electrode currents across the respective preset pairs of electrode sets and their transformers may be tailored, e.g., from the end of the channel to the center thereof.

Advantageously, converters 10 comprise conventional electronic switches, which have been generally denoted S, or the like, connected to the corresponding anodes AN of the electrode pairs for chopping the electrode current to produce control signals, in the form of half-wave square waves having a predetermined frequency of between about 40 and 20,000 Hz at pre-set locations. As shown, a pair of switches S advantageously is connected to each electrode pair. Switches S are gated by conventional gating circuitry, such as a gate driver 30, which produces two gate signals G and G', respectively, which are 180° out of phase with respect to each other at pre-set locations in accordance with the location of the electrodes. Advantageously, the first and second control signals are respectively synchronized for all magnetically linked electrode pairs by gating the corresponding switches S together. Thus in the figures, all switches denoted by the letter S without a prime attached are gated together, 180° out of phase at pre-set locations with the switches denoted by the letter S with a prime attached.

Figure 2:
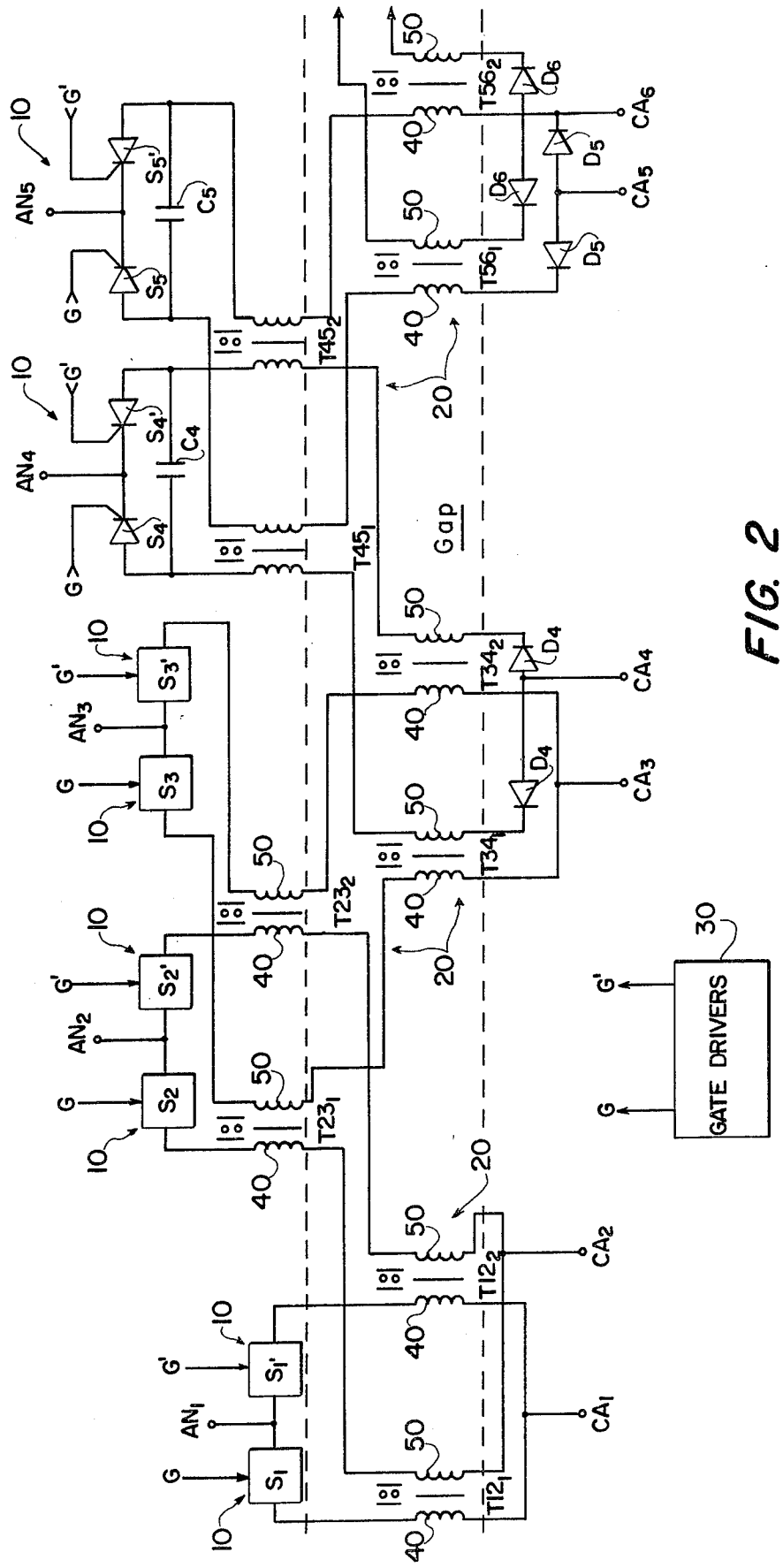
FIG. 2 is a schematic diagram of a second embodiment of a control circuit constructed in accordance with the present invention for controlling the dc currents across the channel at preset locations.

Switches S advantageously either are conventional transistor switches, as is schematically indicated in FIG. 2 for switches $S_1$-$S_3$, if the electrode currents and associated voltage requirements so allow; or are conventional silicon controlled rectifiers (SCR's), as is indicated in FIG. 1 and in FIG. 2 for switches $S_4$ and $S_5$, if the electrode currents and associated voltage requirements exceed the ratings of conventional transistors. When SCR's are employed as switches S, each converter 10 advantageously further comprises a commutating capacitor, generally denoted C, coupling the outputs of the SCR's, plus two blocking diodes, generally denoted D, connected as shown for preventing premature discharge of capacitors C.

Magnetic couplers 20 advantageously comprise transformers, generally denoted T, having a 1:1 or other more general turn ratio, in accordance with the location of the couplers 20 and their respective pre-set pairs of opposed electrodes. Thus, in one example the two transformers for the pairs of opposed electrodes at the opposite ends of the MHD channel have a 1:n turn ratio and the remaining transformers all have 1:1 turns ratios in accordance with the locations of the electrodes in the plurality of pairs of electrodes along the MHD channel. The coupled control signals advantageously are coupled either by parallel magnetic linking or by series magnetic linking. The circuit embodiment of FIG. 1 provides parallel magnetic linking and the circuit embodiment of FIG. 2 provides series magnetic linking.

In the parallel magnetic coupling circuit embodiment of FIG. 1, the group of coupled control signals comprises a "slave" group of the coupled signals, the respective first and second signals of which are coupled to the corresponding first and second signals of a predetermined master pair of the coupled signals. In FIG. 1, the pairs of generator electrodes corresponding to the slave group of coupled control signals have been denoted with the subscript S, and the pair of generator electrodes corresponding to the master pair of coupled control signals has been denoted with the subscript M. It is to be noted that any arbitrary electrode pair within a coupled group can be chosen as the master electrode. It is also to be noted that the electrode pairs of a generator can be divided into a plurality of groups of N electrode pairs, and that the master pair of control signals for each group can be connected with the other master pairs, in the same manner as that shown for an individual group, as slaves to a main master pair of control signals.

Advantageously, the main master pair of control signals are derived in the same manner as that described hereinabove from the generator load current. By so doing, the sum of the electrode currents of a group is forced to have a fixed relationship to the load current in addition to each of the electrode currents being uniform, which allows axial currents in the channel to be eliminated ($J_x = 0$) and thus an ideal diagonal channel to be achieved.

Alternatively, the master control signals can advantageously be linked to conventional active controls (not shown) which can be individually adjusted by the generator operator to effect a fine tuning of the generator loading.

As shown in FIG. 1, in the parallel magnetic coupling embodiment of the present invention couplers 20 advantageously comprise a first transformer, which has been generally denoted T with a first subscript 1, for each of the coupled first control signals in a slave group and a second transformer, which has been generally denoted T with a first subscript 2, for each of the coupled second control signals in a slave group. As will be appreciated by those of ordinary skill in the art, the individual transformers $T_1$ and $T_2$ have also been identified with a second subscript denoting the number of the associated electrode pair within the coupled group of electrode pairs. A first winding 40 of each of the transformers $T_1$ and $T_2$ is connected in series between the output of the corresponding one of the first and second switches S and S', (and thus the corresponding one of the first and second slave control signals) and the corresponding cathode electrodes CA. The second winding 50 of transformers $T_1$ and $T_2$ are respectively connected in series to each other, as shown. The secondary windings 50 of the first transformers in the series, $T_{11}$ and $T_{21}$, are also connected via isolating diodes $D_m$ to the cathode $CA_m$ of the master electrode pair, and the secondary windings 50 of the last transformers in the series, $T_{1N}$ and $T_{2N}$, are respectively connected to the outputs of the corresponding switches $S_m$ and $S_m'$ and thus to the corresponding master control signals. While the switches are shown on the cathode end and the diodes on the other end, these could be turned around the other way, with due regard to device polarities, as understood by one skilled in the art, and the circuit could still operate for its intended purpose of electrode current control.

In the series magnetic coupling circuit embodiment of FIG. 2, a coupled control signal is coupled with neighboring or adjacent control signals upstream and downstream of the channel, which control signals in turn are coupled to their adjacent control signals. As shown in FIG. 2, the control signals of a pair of two adjacent electrode pairs are coupled by first and second transformers which are connected to the respective outputs of switches S and S' such that the adjacent first control signals are connected to the respective windings of the first transformer and the adjacent second control signals are connected to the respective windings of the second transformer. As a specific example, taking the second and third electrode pairs, $AN_2$-$CA_2$ and $AN_3$-$CA_3$, respectively, of a string of coupled electrode pairs as shown in FIG. 2, the respective windings 40 and 50 of transformer $T23_1$ are connected to the outputs of switches $S_2$ and $S_3$, and the respective windings 40 and 50 of transformer $T23_2$ are connected to the outputs of switches $S_2'$ and $S_3'$.

In one specific example, the turns ratios of these windings of transformers $T2_3$, and $T2_3$ are 1:1 respectively in accordance with the locations of the second and third electrode pairs, which are spaced apart along the center of the linearly-extending, divergent, duct or channel Gap through which the plasma flows in an MHD generator.

Coupling of an electrode pair with both the upstream and downstream neighbors thereof is accomplished by providing a further pair of third and fourth transformers, each of which has the respective windings thereof series connected with the corresponding pairs of first and second control signals. As a first specific example, the control signals of electrode pair $AN_2$-$CA_2$ are coupled to the control signals of electrode pair $AN_3$-$CA_3$ by a first pair of transformers $T23_1$ and $T23_2$. The control signals of electrode pair $AN_2$-$CA_2$ are also coupled to the control signals of electrode pair $AN_1$-$CA_1$ by a further pair of transformers $T12_1$ and $T12_2$. As shown, the respective windings 40 and 50 of transformer $T12_1$ are connected to the output of switch $S_1$ and in series with winding 40 of transformer $T23_1$ to the output of switch $S_2$; and the respective winding 40 and 50 of transformer $T12_2$ are connected to the output of switch $S'$ and in series with winding 40 of transformer $T23_2$ to the output of switch $S_2'$.

In one specific example, the turns ratios of these windings of these transformers T12, and $T12_2$ are 1:n in accordance with their location at the end of the MHD divergent channel Gap. In one case of this example these transformers have the specific turns ratios 1:2.

As a second specific example, the control signals of electrode pair $AN_3$-$CA_3$ are coupled to the control signals of electrode pair $AN_2$-$CA_2$ by a first pair of transformers $T23_1$ and $T23_2$ as described hereinabove. The control signals of electode pair $AN_3$-$CA_3$ are also coupled to the control signals of electrode pair $AN_4$-$CA_4$ by a further pair of transformers $T34_1$ and $T34_2$. As shown, the respective windings 40 and 50 of transformer $T34_1$ are connected in series with winding 50 of transformer $T23_1$ to the output of switch $S_3$ and in series with winding 40 of transformer $T45_1$ to the output of switch $S_4$. Similarly, the respective windings 40 and 50 of transformer $T34_2$ are connected in series with winding 50 of transformer $T23_2$ to the output of switch $S_3'$ and in series with winding 40 of transformer $T45_2$ to the output of switch $S_4'$.

In this example, the turns ratios of the transformers are 1:1 along the central portion of the MHD channel Gap and 1:n at the opposite ends thereof.

As shown, the windings of the various pairs of transformers T12, T34, T56 and so on are connected together such that the control signals for each electrode pair are connected to the corresponding cathode CA. Gated rectifier embodiments of switches $S_4$ and $S_5$, as shown in FIG. 1 and described hereinabove, have been shown in FIG. 2 in order to indicate the manner in which commutating capacitors C and blocking diodes D are connected in the circuit of FIG. 2.

As will be appreciated by those of ordinary skill in the art, the parallel magnetic linking of the circuit of FIG. 1 provides a stiffly controlled electrode current uniformity, while the series magnetic linking of the circuit of FIG. 2 provides a somewhat weaker control.

In operation, the preferred frequency range for the control signals is between about 40 Hz and about 5 kilocycles with ordinary transformers having laminations. However, dielectric or air core transformers are used for the higher frequencies up to about 20,000 Hz, since, although they do not have as high a permeability, they have less dissipation such that losses are cut at high-frequencies in practice compared to the transformers having laminations, because the latter have high permeability and electrical conductivity that produces eddy currents.

Advantageously, in the operation of the divergent channel Gap of the MHD generator MHD shown schematically in cross-section in FIGS. 1 and 2, current flows externally along a conductor between electrodes diagonally opposed across a gap in the walls of the generator channel and through the gas in the channel between electrodes opposite one another in the walls of the channel. Each time the current passes through the generator its voltage is increased. In practice when diagonally opposed electrodes are used, an equipotential plane passing through the electrodes is formed. The angle this plane makes with the long axis of the generator, which is a function of which electrodes are connected to each other, is arranged for greatest efficiency. Other factors that enter in are gas temperature and velocity, magnetic field strength, etc. There is a voltage difference between each of the equipotential planes; however, because of the magnetic field, current flows between electrodes opposite one another in the channel walls—ideally—rather than between the equipotential planes.

The circuit of this invention capitalizes on the fact that in a transformer with a 1:n turn ratio, the current in the secondary is equalized or rendered proportional in the same or a constant ratio in accordance with the location of the electrodes along the MHD channel. To this end, the SCR's and the capacitor near the anodes form commutating circuits. When the left SCR's are gated on current flows from the cathodes to the anodes through the left arms of all the circuits. The primaries of all the transformers in the left arms of the slave circuits are in a series circuit with the master anode thus the same currents as flows in the left arm of the master circuit flows through all of the primaries. Because the turns ratio of the transformers is 1:n, in accordance with the electrode currents at pre-set locations along the axis of the MHD channel, the current flow through each of the secondaries is equal or rendered proportional according to location. The secondaries are in series with the slave anodes (and cathodes) so the current which flows through any slave anode is equal to or rendered proportional to that which flows through the master anode in a ratio of 1:n. Ratios of 1:1 are provided for the electrode and control currents in accordance with the pre-set locations of the electrode currents near the center of the MHD channel. On the other hand, ratios, such as $1:>1$ and $>1:1$, are provided at the pre-set locations of the other electrode currents near the opposite ends of the MHD channel. To this end, suitable turns ratios in the transformers therefor are provided.

After some time the current in the left arm is switched to the right arms of the master and slave circuits. To accomplish this, the right SCRS are gated on shutting off the left SCRs and the current in the left arms of the circuits. Current now flows through the right arms of the master and slave circuits and in the same way as before the current flowing in all of the right arms of the slave circuits and in each of the anodes and cathodes are equalized or rendered proportional in the same or constant ratios in accordance with the location of the electrodes. After some period of time the left SCRs are gated on again and the current is shifted to the left arm of the control circuits starting the cycle again. In operation, if there is a perturbation in the current flow in the generator, that is if the current flowing through the generator along any one cathode to anode path begins to rise or fall faster than the average, the effect will be transmitted through the transformer into the master control circuit causing an increase or decrease in current in all circuits thereby tending to prevent the current in any one electrode from varying from that in any other electrode.

In this practical generator one control circuit is connected in series in each diagonal connection and one (any one) of the control circuits is selected to be the master. This makes it possible to group anode-cathode pairs and have a master circuit for each group. One of these master circuits is selected to be the master for all. The amount of current drawn from the generator is controlled by controlling the amount of current flowing in the master circuit, as for example, by injecting a control signal into the master circuit by means of a transformer. Thus, this invention provides a method of equalizing or rendering proportional the current in each anode-cathode pair in a diagonally connected MHD generator in accordance with the location of the electrode current by equalizing or rendering proportional the current in every external anode-cathode connection. This is accomplished by linking each connector magnetically to a master circuit in such a way that the effect on an external circuit of perturbations in current in the generator is to cancel out or render proportional the perturbation among all the electrodes pairs.

Although the invention has been described with respect to exemplary embodiments thereof, it will be understood that variations and modifications can be effected in the embodiments without departing from the scope or spirit of the invention.

We claim:

1. Apparatus for controlling electrode current distribution in dc circuits of the type having a plurality of pairs of opposed electrodes along a channel wherein each electrode pair produces a corresponding dc electrode current at a pre-set location across said channel, and the plurality of pairs produces a load current, said control apparatus comprising:

means for converting each electrode current into first and second periodic control signals which are 180° out of phase with respect to each other and which have equal magnitudes corresponding to the magnitude of the associated electrode current at preset locations across the channel; and means for magnetically coupling individual ones of said first control signals and for magnetically coupling individual ones of said second control signals such that the corresponding electrode currents are equalized or rendered proportional in the same or constant ratios in accordance with the locations of the electrode currents.

2. The control apparatus of claim 1 wherein said converting means comprises switch means connected to the corresponding electrode current for producing first and second half-wave signals constituting said first and second control signals, respectively.

3. The control apparatus of claim 2 wherein said switch means comprises first and second transistor switch means triggered 180° out of phase with respect to each other.

4. The control apparatus of claim 2 wherein said switch means comprises first and second gated rectifiers coupled by a commutating capacitor.

5. The control apparatus of claim 4 wherein said switch means further comprises first and second blocking diodes connected so as to prevent premature discharge of said commutating capacitor.

6. The control apparatus of claim 1 wherein said magnetic coupling means comprises transformer means for parallel magnetic coupling of at least one slave group of said coupled first and second control signals to a corresponding at least one predetermined master pair of said coupled first and second control signals.

7. The control apparatus of claim 6 wherein said magnetic coupling means comprises a first transformer for each of said coupled first control signals in said slave group and a second transformer for each of said coupled second control signals in said slave group; said transformers have first and second windings; each of said slave coupled first and second control signals, respectively, is connected to said first winding of the corresponding transformer; and said second windings of said first and second transformers are respectively connected in series.

8. The control apparatus of claim 7 wherein said coupled first and second control signals, respectively are coupled so as to define first and second slave groups of coupled signals coupled to first and second master pairs of coupled first and second control signals; and said magnetic coupling means further comprises third and fourth transformers for magnetically coupling said first and second master pairs of coupled control signals to control signals derived from the generator load current such that the load current control signals constitute master signals with respect to said master pairs of coupled control signals, thereby allowing axial currents in the generator to be minimized.

9. The control apparatus of claim 1 wherein said magnetic coupling means comprises transformer means for series magnetically coupling first and second adjacent ones of said first control signals and for series magnetically coupling first and second adjacent ones of said second control signals.

10. The control apparatus of claim 9 wherein said series magnetic coupling means comprises first and second transformers having first and second windings, said first and second adjacent first control signals being connected to the respective first and second windings of said first transformer and first and second adjacent second control signals being connected to the respective first and second windings of said second transformer.

11. The control apparatus of claim 10 wherein said series magnetic coupling means further comprises third and fourth transformers having first and second windings; said first windings of said third and fourth transformers are series connected to said windings of said first and second transformers, respectively, for coupling of said second adjacent first and second control signals, respectively, with third adjacent first and second control signals connected to said second windings of said second windings of said third and fourth transformers, respectively.

12. The control apparatus of claim 1 having a plurality of preset pairs of opposed electrode currents that are spaced apart along a linearly extending channel for transmitting said electrode currents across said channel at pre-set locations.

13. The control apparatus of claim 12 in which said means for magnetically coupling individual ones of said control signals comprises transformers having 1:n turns ratios in accordance with the locations of said plurality of pairs of opposed electrode currents across the linearly extending channel.

* * * * *